United States Patent
Takeuchi et al.

[11] Patent Number: 6,127,713
[45] Date of Patent: Oct. 3, 2000

[54] SEMICONDUCTOR PRESSURE DETECTING DEVICE

[75] Inventors: Takanobu Takeuchi; Motomi Ichihashi; Keiji Sasaki, all of Tokyo, Japan

[73] Assignees: Mitsubishi Denki Kabushiki Kaisha; Fujikoki Corporation, both of Tokyo, Japan

[21] Appl. No.: 09/181,929

[22] Filed: Oct. 29, 1998

[30] Foreign Application Priority Data

Feb. 17, 1998 [JP] Japan .................................. 10-034548

[51] Int. Cl.⁷ .................................................. H01L 29/82
[52] U.S. Cl. ............................................. 257/419; 257/420
[58] Field of Search ...................................... 257/419, 420

[56] References Cited

U.S. PATENT DOCUMENTS 5,515,732  5/1996  Willcox et al. ............................ 73/724
5,852,320  12/1998  Ichihashi .................................. 257/419

FOREIGN PATENT DOCUMENTS

| 62-72178 | 4/1987 | Japan . |
| 2-69630 | 3/1990 | Japan . |
| 6-125096 | 5/1994 | Japan . |
| 7-23255 | 4/1995 | Japan . |
| 7-294353 | 11/1995 | Japan . |
| 7-294354 | 11/1995 | Japan . |

*Primary Examiner*—Olik Chaudhuri
*Assistant Examiner*—Douglas A. Wille
*Attorney, Agent, or Firm*—Oblon, Spivak, McClelland, Maier & Neustadt, P.C.

[57] ABSTRACT

A semiconductor pressure detecting device comprises a package having a pressure introducing hole; a base plate which has a first through hole and is mounted in the package; a base mounted on the base plate; and a semiconductor pressure sensor chip which is mounted on the base; wherein the base plate has a thickened portion formed around the first through hole and is fixed by welding the circumference of the thickened portion onto the package.

9 Claims, 3 Drawing Sheets

SEMICONDUCTOR PRESSURE DETECTING DEVICE

BACKGROUND OF THE INVENTION

1. Field of the Invention

The present invention relates to a strain gauge type semiconductor pressure detecting device for detecting relatively high pressure.

2. Description of the Related Art

A strain gauge type semiconductor pressure detecting device of the prior art is disclosed, for example, in Japanese Non-examined Patent Publication No. 7-294353. The semiconductor pressure detecting device disclosed in this publication has a pressure sensor chip 104 mounted in a recess 101b, formed in a body 101, via a metal base 102 (which corresponds to a base plate of the present invention) and a glass base 103, wherein pressure is introduced via through holes 101a, 102a, 103a made in the body 101, the metal base 102 and the glass base 103, respectively, to be concentric with each other, and is applied to the pressure sensor chip 104. While the metal base 102 is fixed by laser welding of the periphery thereof onto the body 101, a circular groove 102b concentric with the through hole 102a is formed inside the laser-welded portion in this prior art example, thereby making the central portion relatively raised so that the glass base 103 and the pressure sensor chip 104 are not subject to undesirable stress caused by thermal expansion of components due to the heat of laser welding.

However, the semiconductor pressure detecting device of the prior art has such a problem that since the laser welding step takes much time, the device can not produced at low cost. Use of the projection welding step may be conceived to counter this problem, but this causes another problem that impact generated during bonding or residual thermal stress may cause breakage in the joint of the base. Further, there has been such a problem that applying a high extraneous pressure causes the metal base to warp, and sufficient margin in the measurement range cannot be obtained for measuring high pressure.

SUMMARY OF THE INVENTION

An object of the present invention is to solve the above problems of the prior art and to provide a semiconductor pressure detecting device of low cost and high reliability, which is capable of measuring relatively high pressure.

A first semiconductor pressure detecting device according to the present invention comprises a package having a pressure introducing hole; a base plate which has a first through hole made at the center thereof and is mounted in the package so that the first through hole is disposed substantially concentrically with the pressure introducing hole; a base which has a second through hole made at the center thereof and is mounted on the base plate so that the second through hole is disposed substantially concentrically with the first through hole; and a semiconductor pressure sensor chip which is mounted on the base and detects a pressure introduced through the pressure introducing hole and the first and second through holes;

wherein the base plate has a thickened portion formed around the first through hole and is fixed by welding the circumference of the thickened portion onto the package.

The thickened portion formed in the base plate makes it possible to prevent the base plate from deforming in the thickened portion under a pressure applied thereto.

In the first semiconductor pressure detecting device according to the present invention, preferably cross section of the base has a rectangular shape and cross section of the thickened portion is a circle of a diameter substantially equal to the diagonal of the rectangular, with the base being mounted right above the thickened portion.

A second semiconductor pressure detecting device according to the present invention comprises a package having a pressure introducing hole; a base plate which has a first through hole made at the center thereof and is mounted in the package so that the first through hole is disposed substantially concentrically with the pressure introducing hole; a base which has a second through hole made at the center thereof and is mounted on the base plate so that the second through hole is disposed substantially concentrically with the first through hole; and a semiconductor pressure sensor chip which is mounted on the base and detects a pressure introduced through the pressure introducing hole and the first and second through holes;

wherein the base plate has a ring placed to surround the first through hole to be concentric with the first through hole and is fixed by welding the circumference of the ring onto the package.

The ring provided on the base plate makes it possible to prevent the portion of the base plate right above the ring from deforming under a pressure applied thereto.

In the second semiconductor pressure detecting device according to the present invention, preferably cross section of the base has a profile substantially matching that of the cross section of the ring and the base is mounted right above the ring.

DESCRIPTION OF THE PREFERRED EMBODIMENTS

The preferred embodiments of the present invention will be described below with reference to the accompanying drawings.

Figure 1:
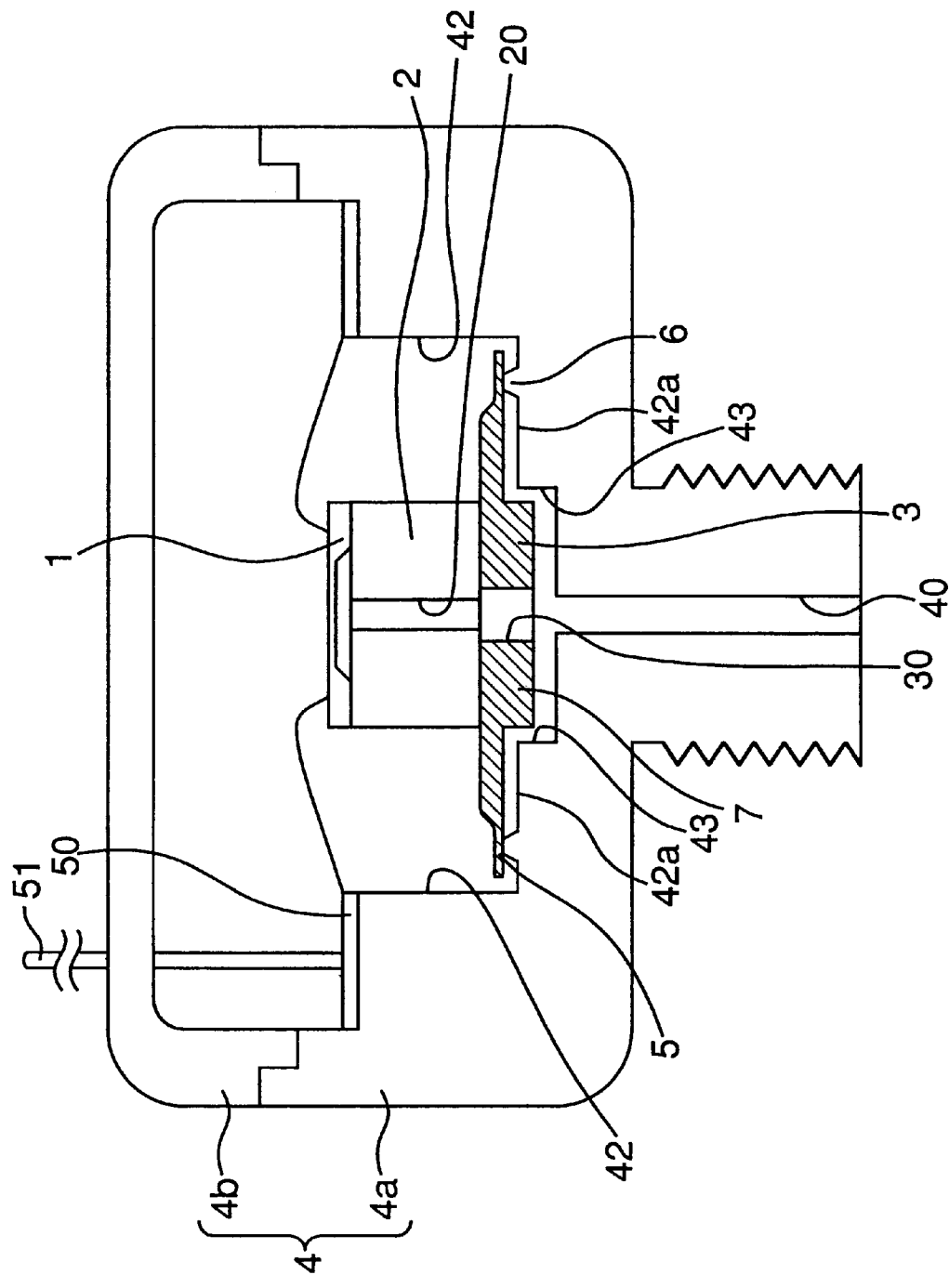
FIG. 1 is a cross sectional view showing the configuration of a semiconductor pressure detecting device according to one embodiment of the present invention.

FIG. 1 is a schematic cross sectional view showing the configuration of a semiconductor pressure sensor according to one embodiment of the present invention. The semiconductor pressure sensor comprises a semiconductor pressure sensor chip 1 mounted in a package 4 as described below.

First, components of the semiconductor pressure sensor of this embodiment will be described.

(1) The semiconductor pressure sensor chip 1 comprises a silicon substrate whereon a bridge circuit made of diffused resistor is formed in a portion where the substrate is made thinner. When a pressure is applied to the thin portion, resistance thereof changes in accordance to the strain caused by the pressure, with the change in resistance turning the bridge circuit out of balance resulting in an electric signal corresponding to the applied pressure being output.

(2) The package 4 comprises a package body 4a and a package cover 4b, while the package body 4a and the package cover 4b combine to form a space to house the semiconductor pressure sensor chip 1 therein.

The package body 4a has a pressure introducing hole 40 formed at the center thereof, a first recess 43 having a cylindrical shape being formed concentrically with the pressure introducing hole 40, a second recess 42 having a cylindrical shape of diameter larger than that of the first recess 43 being formed concentrically with the pressure introducing hole 40 and the first recess 43, and a circular ridge 6 formed for welding purpose to be concentric with the second recess 42 on the bottom surface 42a of the second recess 42. The package 4 may be made of steel or SUS, for example, but there is no restriction on the material according to the present invention.

(3) The base plate 3 is made of 42 alloy or the like formed in substantially disk shape, and has a through hole 30 formed at the center thereof, a thickened portion 7 formed around the through hole 30 to be concentric with the through hole 30 and a thin portion 5 formed on the periphery apart from the thickened portion 7. According to this embodiment, outer diameter of the base plate 3 is set to be slightly smaller than that of the second recess 42, and outer diameter of the thickened portion 7 is set to be slightly smaller than that of the first recess 43. The thin portion 5 is formed to be positioned on the welding ridge 6 formed on the package body 4a when the base plate 3 is placed on the package body 4a. Profile (shape of cross section) of the thickened portion 7 may either be circular, rectangular or any other polygonal shape. Material to make the base plate 3 is not limited to 42 alloy.

(4) The base 2 is a cylinder made of Si, glass or the like having a through hole 20 at the center thereof. The base 2 is formed to have a cross section of substantially the same shape as that of the cross section of the semiconductor pressure sensor chip 1, while the cross section is typically rectangular.

According to the present invention, the thickened portion 7 is preferably smaller across as far as such a condition is satisfied as the base 2 is located within the thickened portion 7 of the base plate 3.

In other words, in case the present invention is embodied by using the circular thickened portion 7 and the base 2 having rectangular cross section, preferably outer diameter of the thickened portion 7 and the diagonal of the cross section of the base 2 are substantially the same. In case the present invention is embodied by using the thickened portion 7 having rectangular cross section and the base 2 having rectangular cross section, preferably the thickened portion 7 and the base 2 have substantially the same cross sectional configuration. The expression "substantially the same" mentioned above means that the difference between two dimensions is not greater than about 0.5 mm which is the tolerable variation in production such as the assembly step.

According to the present invention, however, the relation between the thickened portion 7 and the base 2 with regards to the profile is not limited to those described above. Cross sectional profile of the thickened portion 7 may be either greater or smaller than the cross sectional profile of the base 2, as far as such a condition is satisfied that the stress generated in the base 2 due to warping of the base plate 3 is less than the fracture stress. Whether the condition that the stress generated in the base 2 due to warping of the base plate 3 is less than the fracture stress is satisfied or not is determined by such factors as the shapes of the thickened portion 7 and the base 2, materials used to make the base plate 3 and the base 2 and the maximum possible pressure applied, among others.

The package body 4a constructed as described above is fitted with the base plate 3, the base 2, the semiconductor pressure sensor chip 1, the circuit board 50 and necessary interconnections, with the package cover placed thereon to complete the semiconductor pressure sensor of the embodiment.

The construction of this embodiment will be described in more detail below. The base plate 3 is placed on the package body 4a so that the thickened portion 7 is located within the first recess 43 and the through hole 30 becomes substantially concentric with the pressure introducing hole 40, and is then fixed by projection welding of the thin portion 5 and the ridge 6.

The base 2 is fixed by bonding onto the base plate 3 so that the through hole 20 becomes substantially concentric with the through hole 30.

The semiconductor pressure sensor chip 1 is fixed onto the base 2 by means of an adhesive or the like so that the thin portion whereon the diffused resistor is formed is located right above the through hole 20. The semiconductor pressure sensor chip is fitted with necessary internal wiring by means of wire bonding or the like, with detection signal being output via the circuit board 50 and an output terminal 51.

The semiconductor pressure sensor of this embodiment configured as described above has the thickened portion 7 formed at the joint of the base 2 with the base plate 3, and is therefore capable of minimizing the warp of the base plate (thickened portion) located right below the base 2 even when a relatively high pressure is applied to the base plate 3, thereby making it possible to measure high pressures.

Because the semiconductor pressure sensor of this embodiment configured as described above has the thickened portion 7 formed at the joint of the base 2 with the base plate 3, stress caused by impact and heat during welding is prevented from being transmitted to the base 2, thereby preventing the joint of the base 2 and the base plate 3 from breaking. Consequently, the semiconductor pressure sensor of this embodiment can be produced by employing projection welding step which can be completed in a relatively short period of time compared to laser welding, resulting in a lower production cost.

Figure 2:
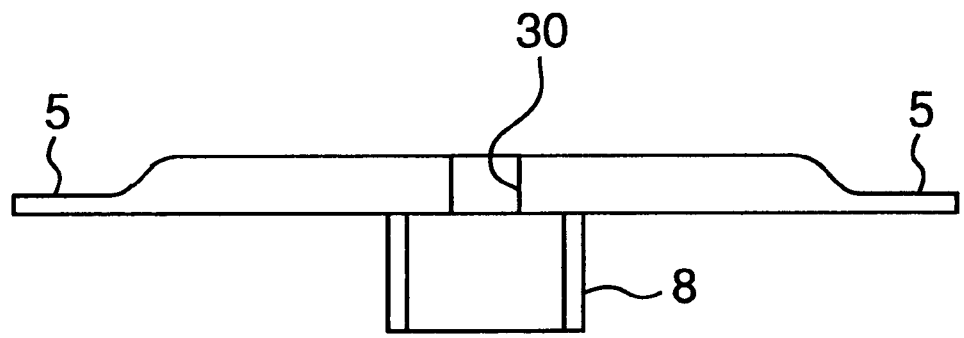
FIG. 2 is a cross sectional view of a base plate of a variation of the present invention.

While deformation of the base plate 3 is prevented by increasing the thickness of the portion of the base plate 3 where the base 2 is mounted in the embodiment described above, the present invention is not limited to this configuration and, as shown in FIG. 2, a ring 8 may be attached onto the base plate on the side opposite to the base by brazing or other method. Similar effects as those of the embodiment described previously can be achieved also with this configuration, and a ring of appropriate width and height determined according to the purpose can be used thus allowing for greater degree of freedom in design. For example, with such a configuration as the thickened portion 7 is formed on the base plate as in the embodiment shown in FIG. 1, there is a limitation on the thickness of the thickened portion 7 when the base plate is made by punching with a press and a die, there is no such limitation when the separate ring 8 is attached.

Figure 3:
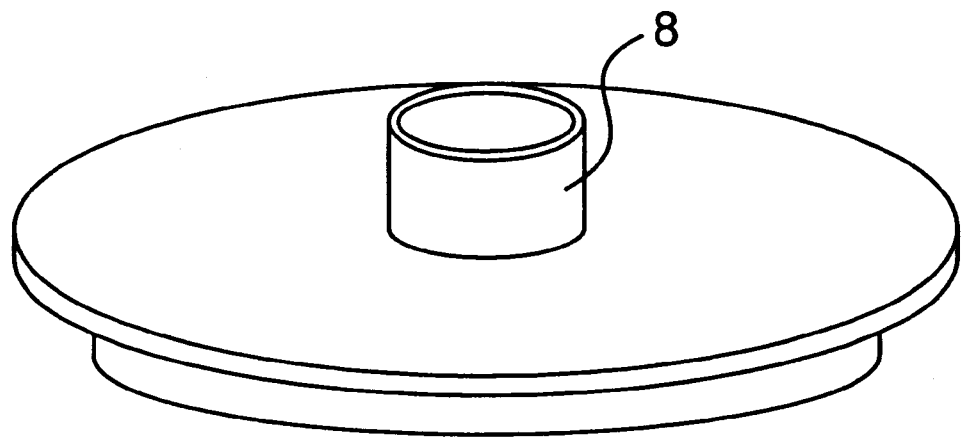
FIG. 3 is a perspective view of the base plate of FIG. 2.
Figure 4:
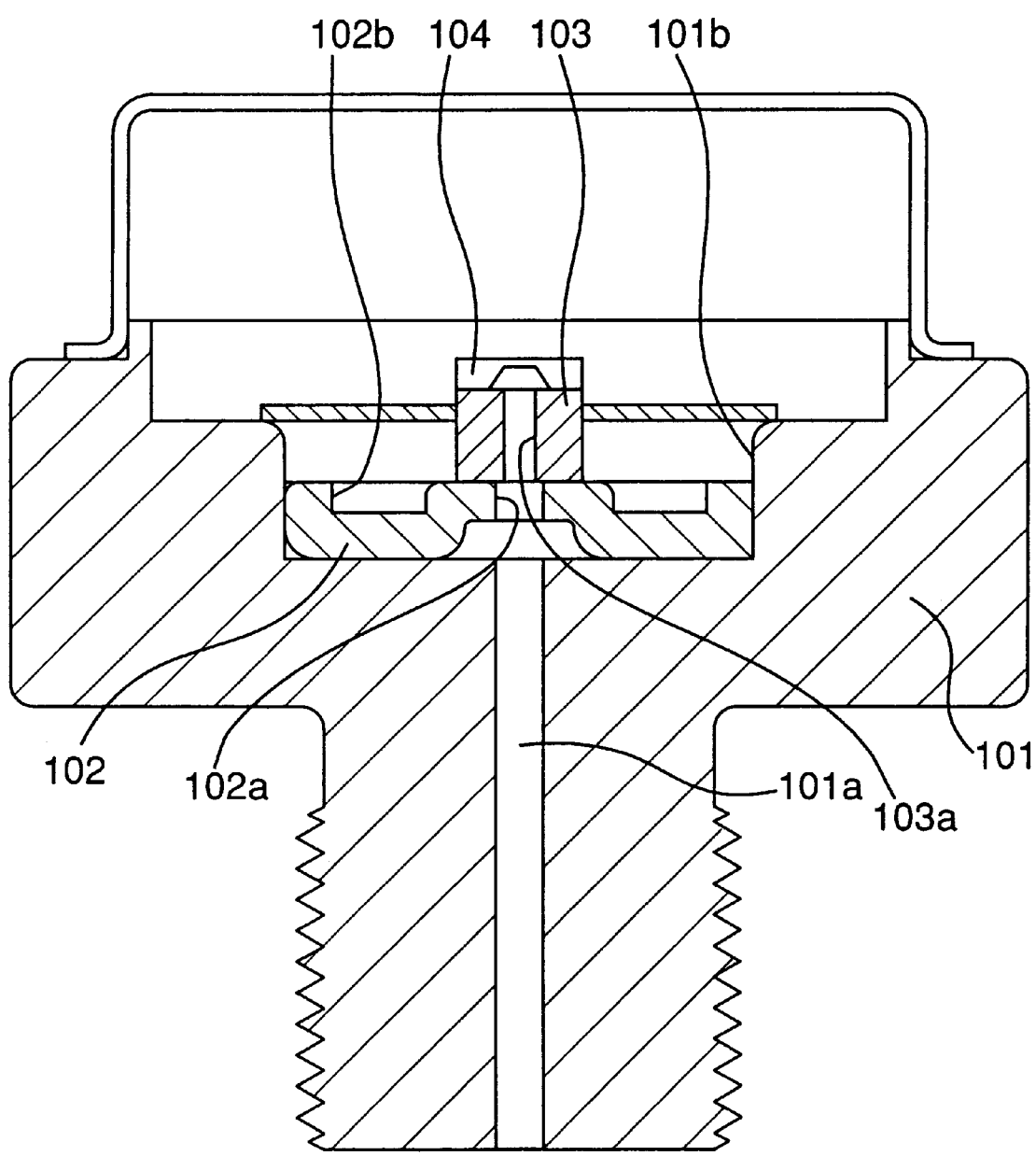
FIG. 4 is a cross sectional view showing the configuration of a semiconductor pressure detecting device of the prior art.

FIG. 3 is a perspective view showing the base plate of this variation of the embodiment up side down.

As will be clear from the above description, the first semiconductor pressure detecting device according to the present invention comprises the package having the pressure introducing hole, the base plate which has the first through hole made at the center thereof and is mounted in the package so that the first through hole is disposed concentrically with the pressure introducing hole, the base which has the second through hole made at the center thereof and is mounted on the base plate so that the second through hole is disposed substantially concentrically with the first through hole, and the semiconductor pressure sensor chip mounted on the base. The base plate has the thickened portion formed around the first through hole and is fixed by welding the circumference of the thickened portion onto the package, thereby making it possible to prevent the base plate from deforming in the thickened portion under a pressure applied thereto. Thus the first semiconductor pressure detecting device according to the present invention can be produced by projection welding which requires shorter period of time, resulting in lower production cost. Also because the semiconductor pressure sensor chip can be prevented from experiencing undesirable stress when a pressure is applied during operation, reliability can be improved and relatively high pressure can be measured.

With the first semiconductor pressure detecting device according to the present invention being made in such a configuration as the cross section of the base has a rectangular shape and cross section of the thickened portion is a circle of a diameter substantially equal to the diagonal of the rectangular while the base is mounted right above the thickened portion, the semiconductor pressure sensor chip can be effectively prevented from experiencing undesirable stress when a pressure is applied, and therefore reliability can be improved and relatively high pressure can be measured.

The second semiconductor pressure detecting device according to the present invention has a ring mounted on the base plate to surround the first through hole concentrically with the first through hole, and the base plate is fixed by welding the circumference of the ring onto the package, thus making it possible to reduce the deformation of the portion of the base plate right above the ring under a pressure applied thereto. Thus the second semiconductor pressure detecting device according to the present invention can be produced by projection welding step which requires shorter period of time, resulting in lower production cost. Also because the semiconductor pressure sensor chip can be prevented from experiencing undesirable stress when a pressure is applied during operation, reliability can be improved and relatively high pressure can be measured.

In the second semiconductor pressure detecting device according to the present invention, the cross section of the base has a profile substantially matching that of the cross section of the ring and the base is mounted right above the ring, the semiconductor pressure sensor chip can be more effectively prevented from experiencing undesirable stress when a pressure is applied, and therefore reliability can be improved and relatively high pressure can be measured.

What is claimed is:

1. A semiconductor pressure detecting device comprising:
   a package having a pressure introducing hole;
   a base plate which has a first through hole made at a center thereof and is mounted in said package so that said first through hole is disposed substantially concentrically with said pressure introducing hole;
   a base which has a second through hole made at a center thereof and is mounted on said base plate so that said second through hole is disposed substantially concentrically with said first through hole; and
   a semiconductor pressure sensor chip which is mounted on said base and detects a pressure introduced through said pressure introducing hole and said first and second through holes;
   wherein said base plate has a thickened portion formed around said first through hole and a thin portion formed on a periphery apart from said thickened portion, said thin portion being fixed by welding onto said package.

2. The semiconductor pressure detecting device according to claim 1;
   wherein a cross section of said base has rectangular shape and a cross section of said thickened portion is a circle of a diameter substantially equal to the diagonal of the rectangular shape, and said base is mounted in an area defined by a circumference of said thickened portion.

3. A semiconductor pressure detecting device comprising;
   a package having a pressure introducing hole;
   a base plate which has a first through hole made at a center thereof and is mounted in said package so that said first through is disposed substantially concentrically with said pressure introducing hole;
   a base which has a second through hole made at a center thereof and is mounted on said base plate so that said second through hole is disposed substantially concentrically with said first through hole; and
   a semiconductor pressure sensor chip which is mounted on said base and detects a pressure introduced through said pressure introducing hole and said first and second through holes;
   wherein said base plate has a ring surrounding said first through hole to be concentric with said first through hole and a thin portion formed on a periphery apart from said ring, said thin portion being fixed by welding onto the package.

4. The semiconductor pressure detecting device according to claim 3;
   wherein a cross section of said base has a profile substantially matching that of a cross section of the ring and the base is mounted in an area of said ring such that said cross sections are substantially aligned.

5. A semiconductor pressure detecting device comprising:
   a package having a pressure introducing hole;
   a base plate which has a first through hole made at a center thereof and is mounted in said package so that said first through hole is disposed substantially concentrically with said pressure introducing hole;
   a base which has a second through hole made at a center thereof and is mounted on said base plate so that said second through hole is disposed substantially concentrically with said first through hole; and
   a semiconductor pressure sensor chip which is mounted on said base and detects a pressure introduced through said pressure introducing hole and said first and second through holes;
   wherein said base plate has a thickened portion formed around said first through hole and a thin portion formed on a periphery apart from said thickened portion, and said package has a circular ridge surrounding said pressure introducing hole, said thin portion being welded onto said circular ridge.

6. A semiconductor pressure detecting device comprising:
   a package having a pressure introducing hole;
   a base plate which has a first through hole made at a center thereof and is mounted in said package so that said first through hole is disposed substantially concentrically with said pressure introducing hole;
   a base which has a second through hole made at a center thereof and is mounted on said base plate so that said second through hole is disposed substantially concentrically with said first through hole; and a semiconductor pressure sensor chip which is mounted on said base and detects a pressure introduced through said pressure introducing hole and said first and second through holes;

wherein said base plate has a thickened portion formed around said first through hole and a thin portion formed on a periphery apart from said thickened portion, said thin portion being fixed by projection welding onto said package.

7. The semiconductor pressure detecting device according to claim 6;

wherein a cross section os said base has a rectangular shape and a cross section of said thickened portion is a circle of a diameter substantially equal to the diagonal of the rectangular shape, and said base is mounted in an area defined by a circumference of said thickened portion.

8. A semiconductor pressure detecting device comprising;

a package having a pressure introducing hole;

a base plate which has a first through hole made at a center thereof and is mounted in said package so that said first through hole is disposed substantially concentrically with said pressure introducing hole;

base which has a second through hole made at a center thereof and is mounted on said base plate so that said second through hole is disposed substantially concentrically with said first through hole; and a semiconductor pressure sensor chip which is mounted on said base and detects a pressure introduced through said pressure introducing hole and said first and second through holes;

wherein said base plate has a ring surrounding said first through hole to be concentric with said first through hole and a thin portion formed on a periphery apart from said ring, said thin portion being fixed by projection welding onto the package.

9. The semiconductor pressure detecting device according to claim 8;

wherein a cross section of said base has a profile substantially matching that of a cross section of the ring and the base is mounted in the area of said ring such that said cross sections are substantially aligned.

* * * * *